T. NEWMAN.
ROPE-TRACE.
No. 7,089. Reissued May 2, 1876.
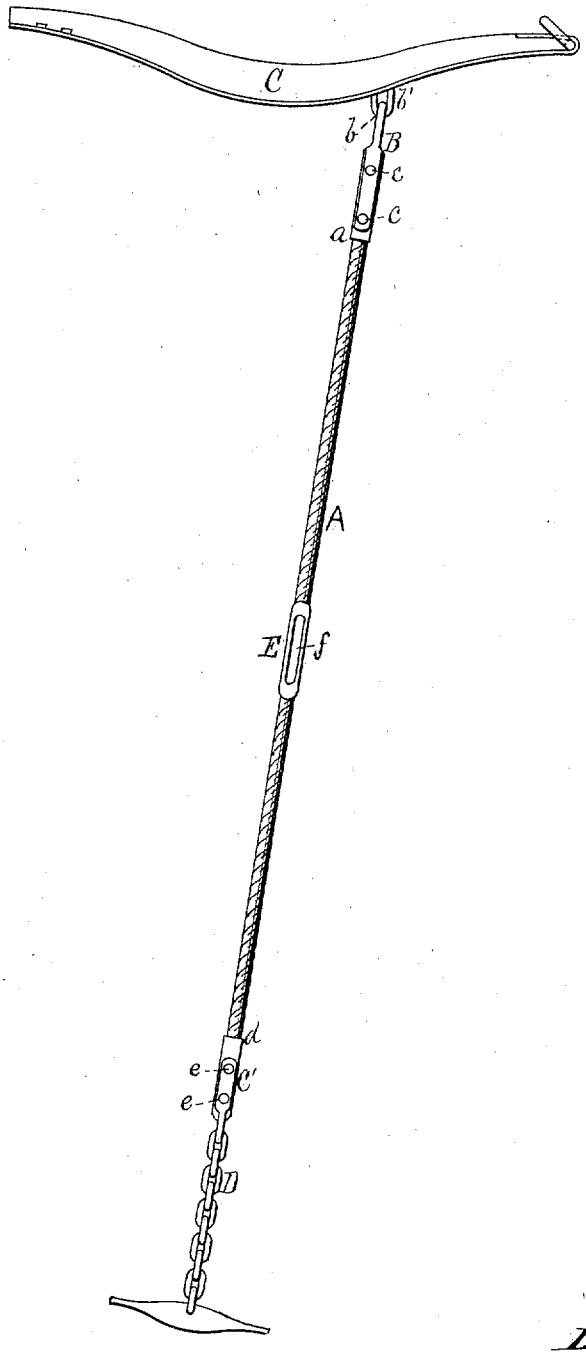
Witnesses:
Edwin James.
John K. Jones.
Inventor:
Thomas Newman.
per J. E. T. Holmead.
Attorney.
N. PETERS, PHOTO-LITHOGRAPHER, WASHINGTON, D. C.

UNITED STATES PATENT OFFICE.

THOMAS NEWMAN, OF NEW ORLEANS, LOUISIANA, ASSIGNOR OF ONE-HALF INTEREST TO JAMES W. BROWNLEE.

IMPROVEMENT IN ROPE TRACES.

Specification forming part of Letters Patent No. 78,757, dated June 9, 1868; reissue No. 7,089, dated May 2, 1876; application filed March 20, 1876.

*To all whom it may concern:*

Be it known that THOMAS NEWMAN, of New Orleans, in the parish of Orleans and State of Louisiana, invented an Improved Rope Trace, on which Letters Patent of the United States were granted to him June 9, 1868, No. 78,757; that THOMAS NEWMAN and JAMES W. BROWNLEE are now the sole owners of said Letters Patent; and that the following is a full, clear, and exact description of the same, reference being had to the accompanying drawing, and the letters of reference marked thereon, making a part of this specification, in which is represented a side view of my improved rope trace.

The nature of my invention consists in constructing a rope trace with metallic clips, when the bearings of said clips fit over, and which, when fastened, confine the ends of the rope in a manner to secure and protect said ends, and, at the same time, provide metallic fastenings, which project beyond the ends of the rope, by means of which the trace can be attached to the collar, hames, or whiffletree without the rope itself being brought in contact therewith.

The construction and operation of my invention are as follows: A represents the trace, which is constructed of manila or hemp rope of any suitable size. On the front end of this rope there is fitted a piece of leather, *a*, and the end of the rope, with this leather around it, is inserted in a metal clip, B, which has an eye, *b*, at its outer end, said eye passing through a similar eye, *b'*, on the hames C. The clip B is secured to the rope by rivets *c*, which pass through the clip, leather, and rope. The leather *a* is the means whereby the clip is enabled to be firmly secured to the rope, and the leather may be sewed or stitched around the rope, if desired, before being inserted into the clip. To the rear end of the rope a similar metal clip, C', is attached in the same way, *d* representing the leather, and *e* the rivets. This clip has a chain, D, connected to it for securing the trace to the whiffletree; and to the rope, a short distance back from its front end, there is attached a metal clip, E, having a staple, *f*, applied to it to secure a back-band to the trace. A back-band is not required in all cases, and, when not required, the clip E may be dispensed with.

By this simple means a rope trace may be adapted for use, and made to have a good appearance for all harnesses, even those constructed for pleasure-vehicles.

The great difficulty hitherto experienced in the use of rope traces has been the attaching of them to the collar, hames, and whiffletrees in a neat manner, and so as to have secure or reliable connection. Loops have been formed with splices, and knots have been made or tied; but this mode of fastening has a very uncouth appearance, and hence rope traces are now only occasionally used with draft-horses, and the most common kind of harnesses.

What I claim as new, and desire to secure by Letters Patent of the United States, is—

1. A rope trace for harness, provided with metallic clips, and having a chain, D, secured to the rear clip, whereby the rope trace can be more conveniently attached to the whiffletree, substantially as described.

2. A rope trace for harness, having metallic clips attached to it through the media of leather and rivets, in the manner substantially as herein shown and described.

3. In combination with the rope trace A, the leather coverings, metallic clips B C' E, and the chain D, all arranged as described, for the purpose specified.

In testimony whereof I have signed my name to this specification before two subscribing witnesses.

THOS. NEWMAN.

Witnesses:

PETER HANNON,
H. N. JENKINS.